Patented Feb. 7, 1950

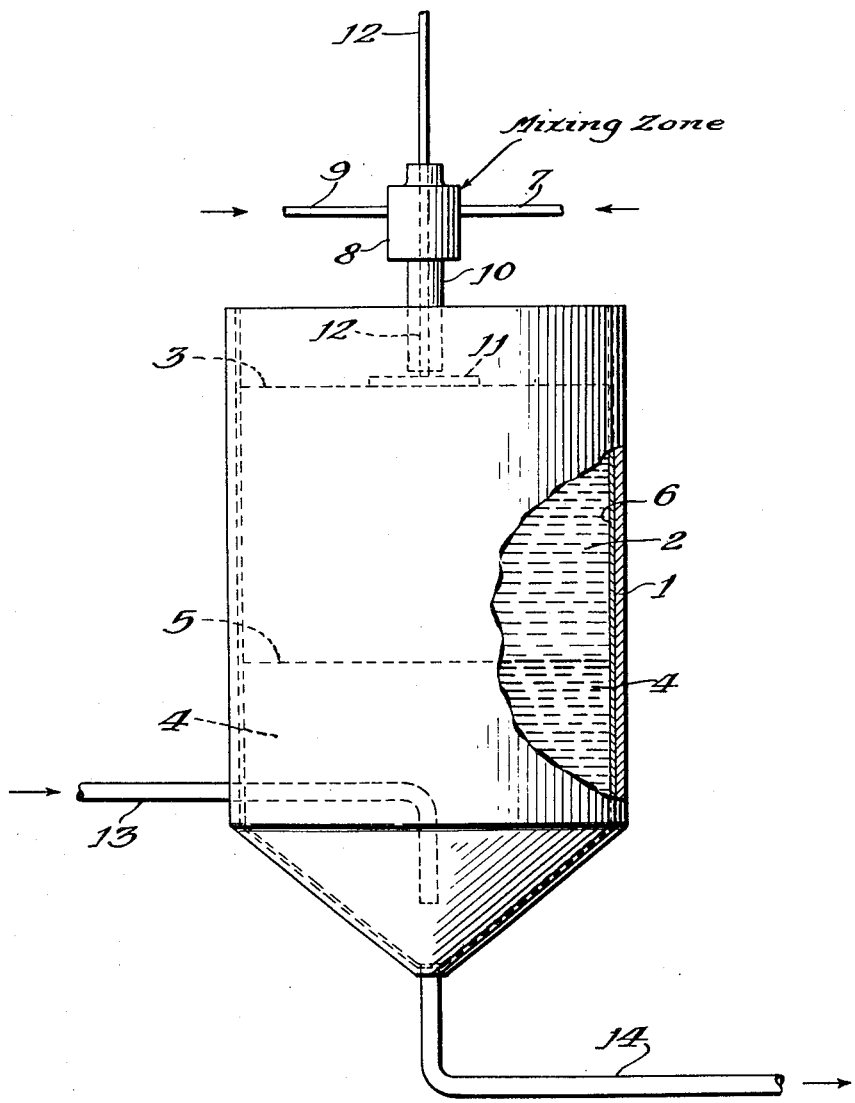

2,496,396

UNITED STATES PATENT OFFICE 2,496,396

MANUFACTURE OF INORGANIC OXIDE SPHERICAL PARTICLES

Louis S. Kassel, Riverside, Ill., ass'gnor to Universal Oil Products Company, Chicago, Ill., a corporation of Delaware Application December 22, 1947, Serial No. 793,307

4 Claims. (Cl. 252—448)

This invention relates to the manufacture of inorganic oxide spherical particles by the technique now known in the art as the oil-drop method.

In the manufacture of spherical particles by the oil-drop technique, an inorganic oxide sol capable of setting to a gel within a reasonable time is comingled with a suitable reagent and dispersed in the form of droplets, either from a rotating disc or through a nozzle, into a liquid suspending medium. The pH of the sol mixture and the depth of the liquid suspending medium are correlated so that the droplets set to firm hydrogel spheres during their passage through the suspending medium. A layer of water is usually disposed beneath the liquid suspending medium and serves as a means of transporting the spheres from the zone in which they are formed.

One difficulty encountered in the manufacture of spherical particles in the above manner is that a substantial proportion of the hydrogel particles accumulate on the inner walls of the forming chamber and ultimately form large agglomerates. When these agglomerates eventually break away from the wall, some of them contain sufficient occluded suspending medium to be intermediate in density between the water and the suspending medium. They therefore accumulate at the interface, and offer serious interference with the passage of hydrogel particles which have not themselves adhered to the walls.

The present invention is directed to a novel method of avoiding the agglomeration of hydrogel particles against the walls of the forming chamber.

In one embodiment the present invention relates to a process for the manufacture of spherical particles which comprises passing an inorganic oxide sol in the form of droplets into a water-immiscible liquid suspending medium in a forming zone, preventing agglomeration of hydrogel particles on the internal surfaces of said forming zone by constructing said internal surfaces of a solid material preferentially wetted by but substantially insoluble in said suspending medium.

In a specific embodiment the present invention relates to a process for the manufacture of silica spheres which comprises commingling waterglass and sulfuric acid, passing the resultant mixture in the form of droplets through a water-immiscible suspending medium in a forming chamber, preventing agglomeration of silica hydrogel particles on the internal surfaces of said forming chamber by coating said internal surfaces with a solid polymer of ethylene.

Although the present invention is particularly applicable to the manufacture of silica spheres, the novel features thereof may be used in the preparation of spherical particles of any inorganic oxide sol which sets to a gel within a reasonable time. The sols may be formed from compounds of silica, titanium, zirconium, thorium, cerium, aluminum, etc. Silica sols may be obtained, for example, by hydrolysis of silicates such as ethyl orthosilicate, alkali metal silicates, and particularly sodium silicate which is ordinarily called "water-glass." The hydrolysis may be effected by adding a small amount of acid such as sulfuric acid, hydrochloric acid, etc. to the silicate.

Alumina sols may be prepared by the addition of aluminum amalgam to water or by precipitating hydrated alumina from aluminum salts, such as aluminum sulfate, aluminum nitrate, aluminum chloride, etc. by the addition of a basic precipitant, such as ammonium hydroxide, sodium hydroxide, potassium hydroxide, etc., washing the precipitate and redissolving the precipitate in weakly ionized acids, such as acetic acid, formic acid, etc.

In the preparation of catalyst for the conversion of organic compounds and particularly, hydrocarbons as, for example, the cracking of higher boiling oils to produce gasoline, dehydrogenation of normally gaseous or normally liquid hydrocarbons, hydrogen transfer reactions, alkyl transfer reactions, condensation reactions such as polymerization, alkylation, etc., isomerization of olefins, etc., the inorganic oxide particles may be composited with a catalytically active component. For example, particularly satisfactory cracking catalysts comprise composites of silica with alumina, zirconia, thoria, or mixtures thereof, and particularly dehydrogenation catalysts comprise composites of alumina with oxides of chromium, molybdenum, vanadium, or mixtures thereof.

In one method of preparing catalysts, the inorganic oxide spheres, such as silica, may be formed in the manner hereinbefore set forth and then composited with alumina, zirconia, etc. in any suitable manner as, for example, by adding a salt of aluminum, zirconium, etc. and precipitating the oxide thereof by adding a suitable basic reagent such as ammonium hydroxide, etc. In another method of preparing catalyst, the inorganic oxide sols may be commingled prior to the formation of the droplets and thereafter co-gelled into composite spherical particles by the oil-drop technique.

The pH of the sol mixture and the depth of the liquid suspending medium are correlated so that the droplets set to firm hydrogel spheres during passage through the liquid suspending medium. Preferred liquid suspending media comprise water-immiscible organic liquids and particularly hydrocarbons such as kerosene, naphtha, mineral seal oil, nujol, etc.

The invention will be further explained with reference to the accompanying drawing which is a side-elevational view partly in section and illustrates one specific embodiment of the invention.

Referring to the drawing, numeral 1 designates a forming chamber for the manufacture of inorganic oxide spherical particles. Forming chamber 1 comprises an upper forming zone indicated at 2 and, in the case here illustrated, contains a body of water-immiscible liquid suspending medium to the level indicated at 3. The lower portion of the forming chamber indicated at 4 comprises a collecting zone and contains a body of water to a level indicated at 5.

In accordance with the invention, the inner surfaces of the forming chamber are lined with a suitable solid material as indicated at 6. The lining may comprise any solid material which is preferentially wetted by and substantially insoluble in the liquid suspending medium. In addition, the solid material should be non-swelling so that it will retain its shape. The lining may be installed in any suitable manner, such as by being cemented or otherwise attached to the walls of the chamber or by being suspended from the top and allowed to rest against the inner walls.

The lining preferably comprises a solid polymer of ethylene which is now commonly referred to in the art as polythene. This material is generally made by the polymerization of ethylene at high pressures which generally are above about 100 atmospheres and at temperatures above about 200° F. Generally the polymerization is effected in the presence of a small amount of oxygen so that the final polymers contain very low percentages of oxygen. The resulting polymers generally have a molecular weight in excess of about 6000 and usually have a melting point of between about 200° and 500° F. Polymers formed in this manner have been found to be preferentially wetted by oil but substantially insoluble therein. In addition, these polymers are non-swelling.

Other satisfactory but not necessarily equivalent linings may comprise solid polymers of chloroprene. These polymers are generally classified as synthetic rubbers. It is understood that other suitable synthetic rubbers or plastics which meet the qualifications hereinbefore set forth may be used in accordance with the present invention.

The polythene material may be obtained in the form of thin sheets which are readily installed in the forming chamber. It is necessary to line the walls of the chamber only for that portion of the chamber which contains the liquid suspending medium. However, when desired, the lining may extend the full length of the forming chamber.

Referring again to the drawing, water-glass may be introduced through line 7 into mixing zone 8, while a suitable acid is introduced through line 9 into the mixing zone. In zone 8 the two liquids are mixed and then pass through tube 10 to revolving disc 11 which is attached through shaft 12 to suitable motivating means, not illustrated. In the case here illustrated, the revolving disc is positioned at the level of the suspending medium, and the mixture of acid and water-glass are dispersed in the form of droplets from the revolving disc.

A portion of the droplets will be thrown against and float towards the walls of the chamber. In the absence of the novel features of the present invention, the particles agglomerate on the walls of the chamber and do not form the desired spherical particles. However, in accordance with the present invention, the inner surfaces of the forming chamber are now lined with a material which is preferentially wetted by the oil and the hydro sol particles which reach the inner surfaces run down in individual droplets. There is no permanent adhesion of hydrogel to the surface, and no accumulation of large agglomerations either on the surfaces or at the interface.

The hydrogel particles pass through the suspending medium and are set to firm hydrogel spheres by the time they reach the body of water disposed beneath the suspending medium. Water may be introduced through line 13 and the water serves to carry out the spherical particles from the lower portion of the collecting zone through line 14. The spheres may then be given any further treatment as hereinbefore set forth.

The embodiment illustrated in the drawing comprises one in which the hydrogel particles pass downwardly through the suspending medium. It is readily seen that the novel features of the present invention may also be utilized in operations in which the density of the suspending medium is greater than that of water and the hydrogel particles are passed upwardly through the suspending medium.

The novelty and the utility of the present invention will be further illustrated by the following example.

*Example*

Silica spheres were made by commingling sulfuric acid with water-glass containing 14% by weight $SiO_2$ to form a mixture having a pH of 7. The mixture was dispersed as droplets from a rotating disc into a body of mineral seal oil having an A. P. I. gravity at 81° F. of 30.3. The forming chamber was made of steel, 10' long x 2'7" I. D., and contained a 3 foot layer of oil positioned above a 7 foot layer of water. In order to avoid the difficulty of hydrogel particles agglomerating on the walls of the chamber, a 4 foot wide sheet of polythene was suspended from the top of the chamber to rest against the internal walls of the chamber. The hydrogel particles now did not agglomerate on the internal surfaces, but slid down the lining and descended through the oil bath. This resulted in a greater recovery of desired silica spheres.

I claim as my invention:

1. In a process for the manufacture of spherical particles wherein an inorganic oxide sol capable of setting to a hydrogel is passed in the form of droplets into a water-immiscible liquid suspending medium in a forming zone, the method of preventing agglomeration of hydrogel particles on the internal surfaces of said forming zone which comprises interposing between said internal surfaces and said suspending medium a solid polymer of ethylene preferentially wetted by but substantially insoluble in said suspending medium.

2. In a process for the manufacture of spherical silica particles wherein a mixture of water-glass and acid is passed through a liquid suspending medium under conditions to form firm hydrogel spheres in a forming zone, the method of preventing agglomeration of hydrogel particles on the internal surfaces of said forming zone which comprises interposing between said internal surfaces and said suspending medium a solid polymer of ethylene preferentially wetted by but substantially insoluble in said suspending medium.

3. The process of claim 2 further characterized in that said suspending medium comprises a hydrocarbon oil.

4. In a process for the manufacture of spherical silica particles wherein a mixture of water-glass and sulfuric acid is passed through a layer of oil under conditions to form firm hydrogel spheres in a forming zone, the method of preventing agglomeration of hydrogel particles on the internal surfaces of said forming zone which comprises interposing polythene between said internal surfaces and said oil.

LOUIS S. KASSEL.

REFERENCES CITED

The following references are of record in the file of this patent:

UNITED STATES PATENTS

| Number | Name | Date |
|---|---|---|
| 2,384,455 | Daley et al. | Sept. 11, 1945 |
| 2,400,465 | Marisic | May 14, 1946 |
| 2,446,783 | Payne | Aug. 10, 1948 |
| 2,446,784 | Daley et al. | Aug. 10, 1948 |

OTHER REFERENCES

Polythene, Ind. and Eng. Chem., vol. 37, pages 529, 530, and 533, June 1945. (Copy in Library.)